United States Patent [19]
Iwao

[11] 3,841,160
[45] Oct. 15, 1974

[54] AUTOMATIC SAMPLER APPARATUS
[75] Inventor: Kumiry Roy Iwao, Lafayette, Calif.
[73] Assignee: Varian Associates, Palo Alto, Calif.
[22] Filed: Mar. 5, 1973
[21] Appl. No.: 337,802

[52] U.S. Cl. ......... 73/422 GC, 128/218 A, 222/309
[51] Int. Cl. ............................................... G01n 1/28
[58] Field of Search ........ 73/423 A, 422 GC, 425.6;
23/253 R, 259 R; 222/43, 309; 128/218 R,
218 A, 218 G

[56] References Cited
UNITED STATES PATENTS

| | | | |
|---|---|---|---|
| 1,081,817 | 12/1913 | Deming | 222/309 |
| 3,479,880 | 11/1969 | Mutter et al. | 73/423 A |
| 3,550,453 | 3/1969 | Lightner | 73/422 GE |
| 3,604,269 | 9/1971 | Smith | 73/423 A |

Primary Examiner—S. Clement Swisher
Attorney, Agent, or Firm—S. Z. Cole; G. M. Fisher

[57] ABSTRACT

A system for injecting sample fluids into an analyzer and processing the analysis data is disclosed. The system comprises a fluid sample analyzer, a sample storage module for a number of fluid samples, an injection module by which samples are injected into the analyzer, a data recording or processing device, and a control module for governing the sequencing the the operation of the system.

The storage module houses a plurality of sample containing trays which can be loaded with samples remote from the system. A gas operated purging system is employed for minimizing the quantity of residual material injected into the analyzer with successive samples.

3 Claims, 17 Drawing Figures

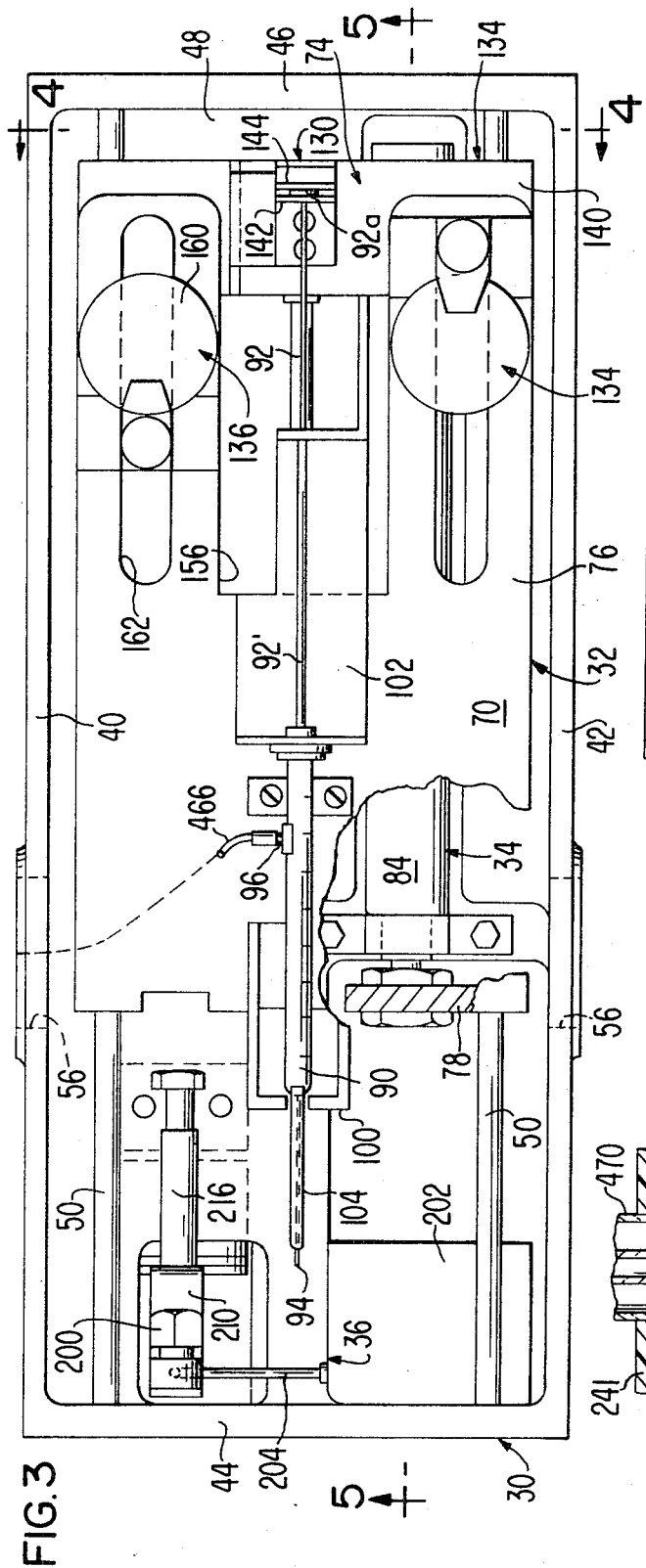
FIG. 3
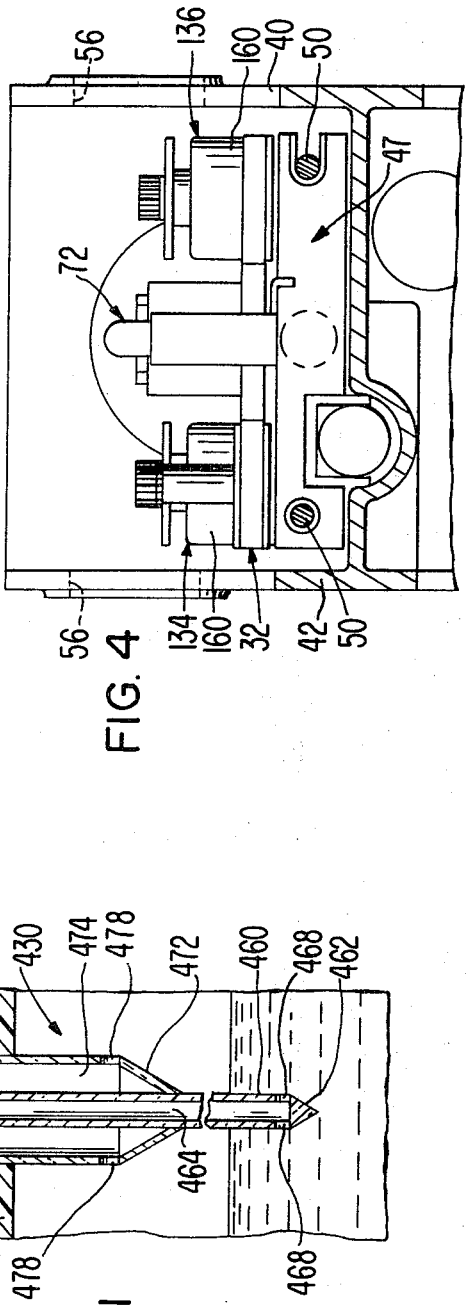
FIG. 4
FIG. 11

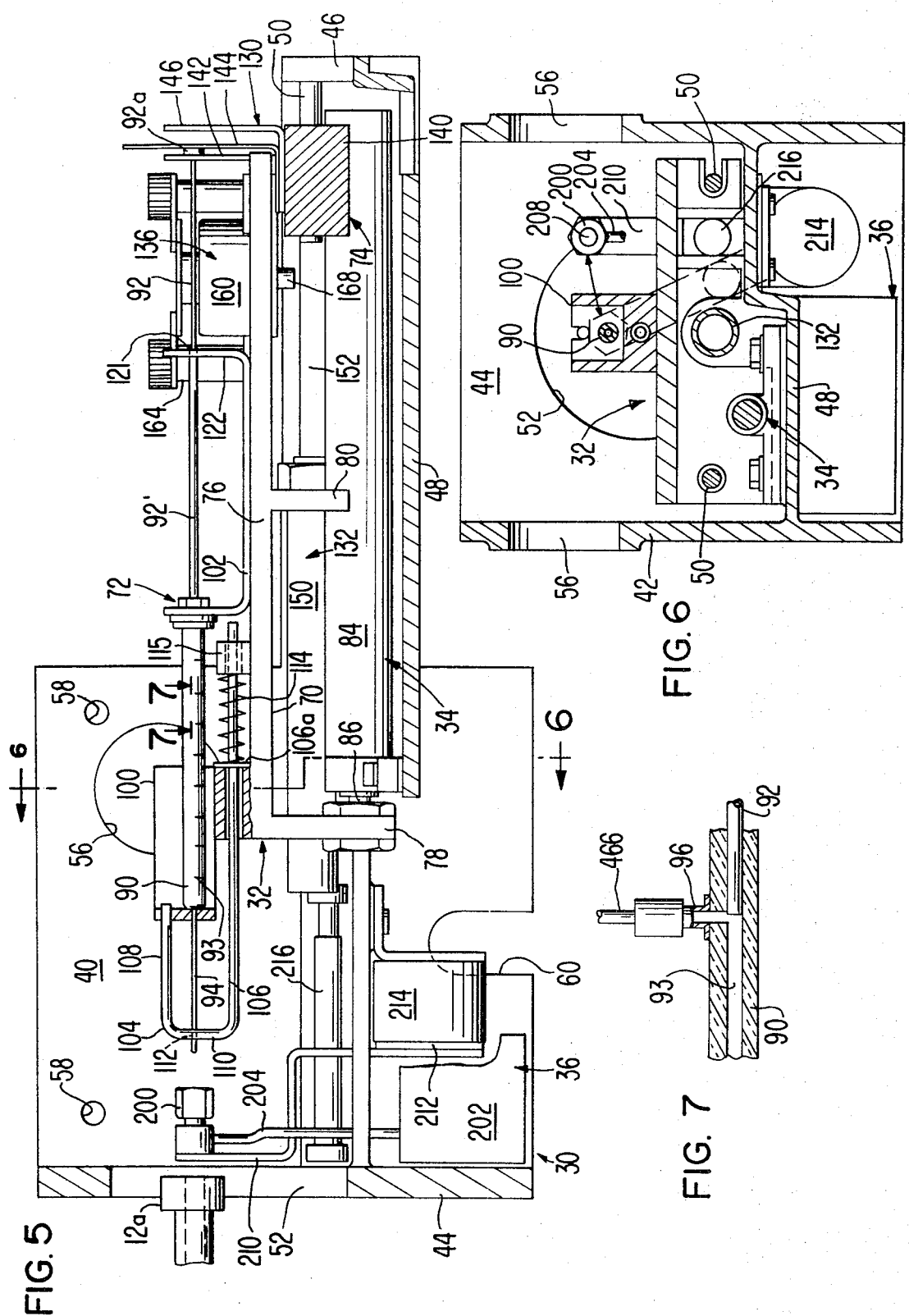

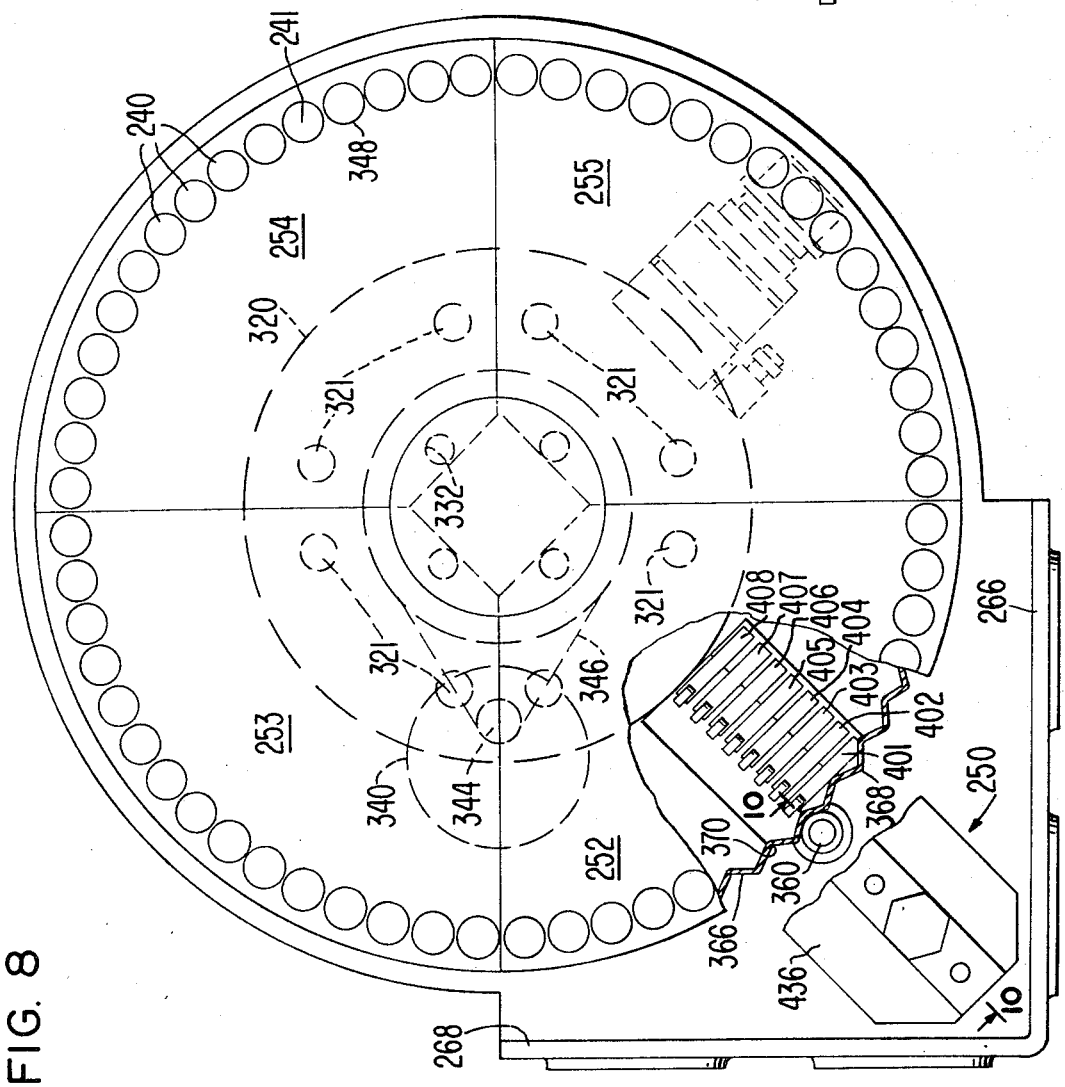

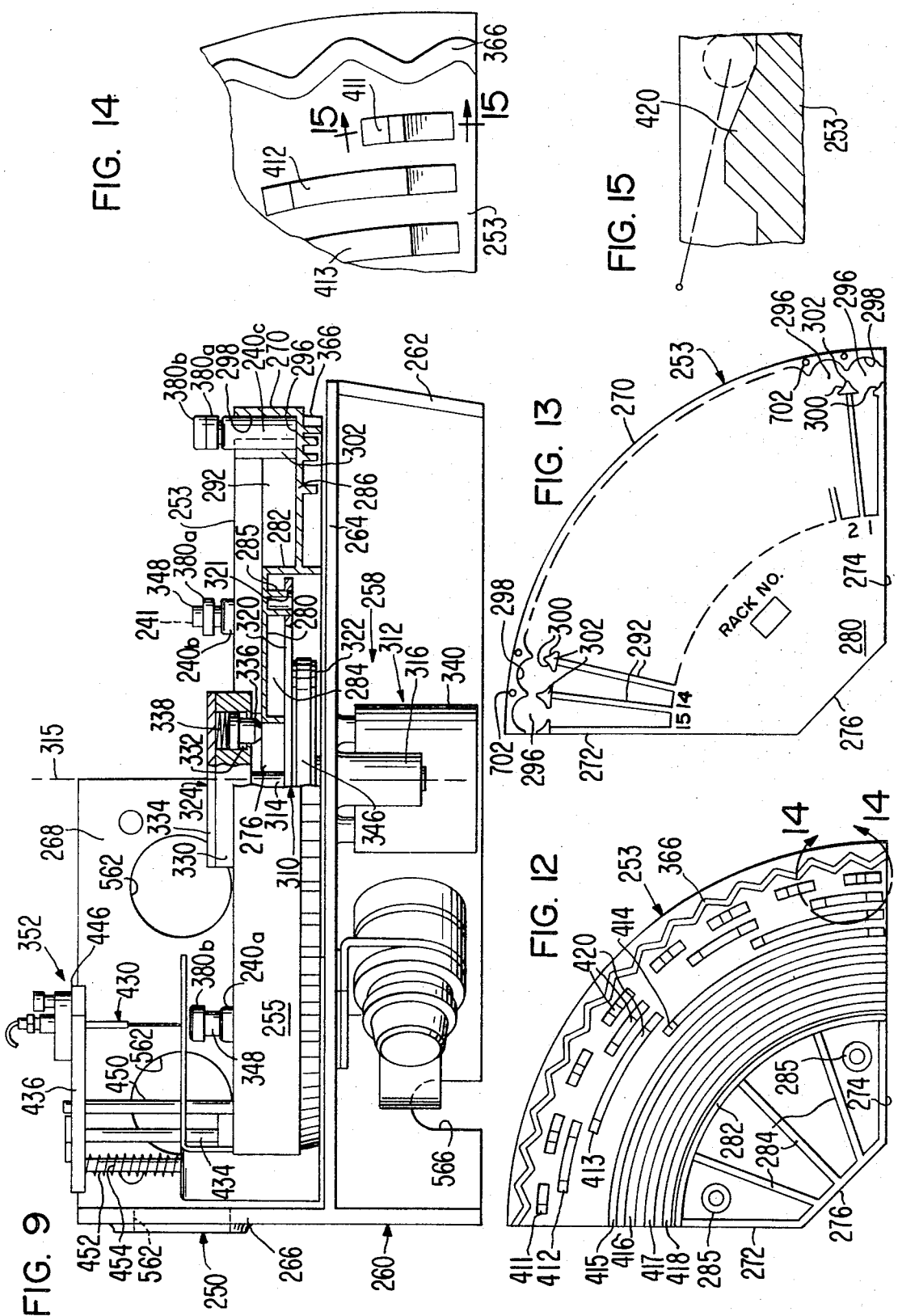

FIG. 17

AUTOMATIC SAMPLER APPARATUS

Background of the Invention

1. Field of the Invention

The present invention relates to the analysis of sample fluids and more particularly relates to systems for controlling the introduction of sample fluids into an analyzer.

2. Prior Art

Systems for supplying fluid samples for analysis by equipment, such as chromatographic analyzers, have been proposed by the prior art. Some prior art systems have employed a syringe for introducing a predetermined quantity of sample fluid into the analyzer equipment. Sample fluids to be analyzed were disposed in separate closed sample containers and successive individual fluid samples were removed from their containers, supplied to the syringe, and injected into the equipment.

It is imperative in most sample analyses that the sample fluid being analyzed be as free as possible from any type of foreign substance. Accordingly, the injection syringe was required to be thoroughly purged of one sample fluid and/or any residual cleansing solvent before a succeeding sample was placed in the syringe. The syringes employed for sample fluid injection were quite delicate because of the extremely small quantities of sample fluid they handled, e.g., quantities of from 5 – 50 microliters, this made manual operation and purging of the syringes both tedious and time consuming. Furthermore, when large numbers of samples were being successively analyzed, a skilled operator was required to attend the equipment and perform the tedious and repetitive task of purging and filling the syringe.

In order to increase the speed and efficiency of the analysis of multiple fluid samples, mechanized syringe handling systems were proposed. The purpose of such systems was to reduce the amount of operator time required in connection with the analysis procedures and to reduce equipment failures, e.g., the syringe breakage and damage which inevitably resulted from frequent handling.

The mechanized systems generally consisted of a supporting tray for sample containers and an injection syringe manipulating mechanism which functioned to enable removal of sample fluid from individual containers, injection of the fluid into the analyzer and purging of the syringe. The sample container trays were usually actuatable to index successive sample containers to a location from which fluid was transferred to the syringe.

While the prior art mechanized systems were effective in reducing the amount of operator time required to analyze fluid samples, several problems relating to syringe manipulation and purging remained unsolved and errors in sample identification due to handling by the operators were encountered.

The sample identification errors were most frequent in circumstances where fluid samples from a number of different laboratories or other sources were analyzed on a time sharing basis by a centralized analyzer. In such a situation the analyzer operator was sometimes required to load large numbers of sample containers containing unfamiliar substances into the container storage trays and, in one way or another, account for the analysis of the various individual samples. The sample container storage trays also frequently contained identical solvent containers used for purging the syringes. Mistakes as to the identity of individual samples tended to occur because of confusion in handling and placement of the sample containers in the apparatus.

In order to remedy this problem the use of sample labeling devices, such as punched cards, was proposed. These devices were frequently combined with card reading apparatus associated with the sample storage apparatus. The use of such sample identification devices required the preparation of identification cards, the provision of identification codes, etc., Furthermore, the card reading devices were sometimes complex and thus increased the size and complexity of the sample storage and syringe manipulating equipment. As a result the initial equipment costs were increased and servicing and maintenance of the equipment was complicated. Furthermore, the possibility of human errors in handling the identifying information was not eliminated.

In some proposals the mechanized syringe purging left undesirably large quantities of foreign materials in the samples which were injected into the analyzers. In one type of system, for example, the syringe plunger was mechanically reciprocated during purging to draw in and expel successive charges of solvent and/or sample fluid prior to injection of that sample fluid into the analyzer.

In another type of system, a side arm syringe was employed and purging was accomplished by retracting the syringe plunger beyond the syringe side arm port after which solvent and/or sample fluid was pumped through the syringe barrel for a predetermined period of time.

Both of these purging procedures, while preferable to manual purging, left undesirably large quantities of foreign material in the sample fluid injected into the analyzers. In particular it was discovered that volatile fluids created pump cavitation which resulted in the formation of gas bubbles in the purge fluid. This reduced the purging effectiveness.

In still other proposals, sample liquids were subjected to a predetermined differential gas pressure for a predetermined period of time so that the sample liquid was forced through the injection syringe and associated conduits to effect purging. Because sample fluid viscosity varied widely, these systems were subject to expending too much sample fluid during the purging process when low viscosity fluids were employed, and did not expend adequate quantities of fluid for complete purging of highly viscous samples. In circumstances where highly volatile fluid samples were analyzed the partial pressure of the fluid vapor tended to substantially increase the applied pressure differential and the purge volume was thus difficult to accurately control.

Prior art apparatuses for sample storage and injection were frequently designed to accommodate one particular type of analyzer. For example, some analyzers were constructed with horizontal sample inlets while others had vertical sample inlets and the orientation of the sample storage apparatus with respect to the injection apparatus was necessarily difficult from analyzer to analyzer depending on the analyzer constructions. Hence, in a facility having several differently constructed analyzers, the sample injection and storage apparatus could not always be interchanged between the analyzers.

SUMMARY OF THE INVENTION

The present invention provides a new and improved sample analysis method and system wherein fluid samples to be analyzed need not be loaded by the operator of the analysis system and confusion as to the identity of fluid sample analysis results is minimized; sample fluid injection equipment and associated sample flow conduits are purged by a controlled volume of purging fluid so that samples of fluid injected in the apparatus are nearly uniformly pure regardless of differences in sample fluid viscosity and/or volatility; the volume of sample fluid injected into the analyzer is accurately governed by adjustable dosage controls; damage to syringe-like elements of the system resulting from misalignment of sample containers or other fluid receivers and the syringe-like elements is avoided; and numerous different sample fluids can be analyzed automatically without requiring full time attendance of a skilled operator.

In a preferred and illustrated embodiment of the invention a sample analysis system is provided which comprises a sample analyzer, preferably a gas chromotograph, a sample injection module by which a sample of fluid to be analyzed is injected into the analyzer, a sample storage module which houses a number of discrete samples of fluid to be analyzed and which supplies sample fluid to the injection module, a sample analysis computer which may be programmed to partially govern operation of the system and to receive raw data from the analyzer concerning the analysis of the given sample of fluid, a recorder which is connected to the analyzer for producing graphic information convering the analysis of given samples by the analyzer, and an electronic control module which governs operation of the components of the system.

The sample storage module receives a plurality of separate sample storage trays, or racks, in which a number of sample containers may be placed. The trays or racks are detachably connected to the storage module and as such can be loaded with samples remote from the analysis system. The trays or racks can be loaded with containers in laboratories and forwarded to the analysis system. The operator of the system thus does not have to load or unload trays and is not required to account for the identity and location of any given fluid sample.

The storage module and sample trays cooperate to automatically provide information concerning the identity of the sample being analyzed to the electronic control module so that the analysis data produced by the computer and/or recorder is automatically coded with the identity of the sample being analyzed. In the preferred and illustrated embodiment of the invention the sample trays carry a series of cam tracks which interact with a series of switches in the storage module. The switches are actuated to identify the rack and contain position of the sample being analyzed by binary numbers. These numbers are decoded and printed on the output data of the computer or recorder.

The new system is also capable of distinguishing between a sample container and a solvent container as well as determining when the samples in all of the containers have been analyzed.

The sample storage module is detachably connected to the injection module and sample fluid which is withdrawn from an individual container in the storage module is conducted into the injection module via a sample conduit. The injection module includes a syringe connected to the conduit which injects a predetermined dose of the fluid into the analyzer. Prior to the injection of a sample, the sample conduit and the injection syringe in the module are purged to remove residual fluid from a previous cycle of the system.

An important feature of the invention resides in the purging process by which a predetermined amount of purging energy is provided to the fluid in the storage module so that a controlled quantity of the purging fluid is directed through the sample conduit and injection syringe. In the preferred and illustrated embodiment of the invention, purging fluid (either sample fluid or a solvent) is located in a container which is closed by a septum. A syring-like dipper tube assembly is advanced into the container through the septum. The dipper tube assembly comprises a first tube which communicates with the injection syringe through the sample conduit and a second tube which is connected with a purging system.

When the dipper tube assembly is advanced into the container, vapor pressure in the container is vented to atmosphere through the purging system dipper tube to produce atmospheric pressure in the container. The purging system is then operated to expose the fluid in the container to a predetermined volume of gas at a predetermined pressure, preferably by discharging an accumulator into the container via the second dipper tube conduit. This creates a pressure differential across the sample extracting dipper tube, the conduit and the injection syringe so that a predetermined quantity of the fluid is directed through the injection module. The pressure differential across the purging fluid diminishes as fluid flows from the container and when the pressure differential has decayed to about zero, a predetermined quantity of the fluid has been flowed through the conduit and injection syringe. It has been found that the use of a purging volume approximately 10 times the volume of the sample conduit and injection syringe consistently reduces the quantities of residual material in the system to extremely low levels.

Where viscous liquids are being analyzed the new system can be operated to provide an additional discharge of the accumulator into the sample container to provide a boost in the pressure differential across the conduit and the injection syringe during the purge. This boost in pressure increases the rate of the viscous fluid flow through the sample conduit and syringe. This capability helps insure that adequate purging volumes of relatively viscous sample fluids are obtained.

Another important feature of the invention resides in the positioning of the injection syring plunger during the purging process. In the preferred and illustrated embodiment of the invention the injection syringe is a side arm syringe and the projecting end of the syringe plunger is at least partially aligned with the side arm port in the syringe barrel so that purging fluid directed through the syring impinges directly on the end of the plunger. This has the effect of scouring the plunger end to dislodge any remaining material from a previous injection or purging cycle and to remove that material from the syringe.

While the system is being purged, the injection syringe directs the purging fluid into a drain system which retains the fluid and minimizes the amount of fluid vapor in the atmosphere around the injection module. When purging has been completed the injection syringe is operated to move the plunger of the syringe to a position at which a controlled dose of the sample liquid is disposed in the syringe after which the syringe is removed from the drain and inserted into the analyzer inlet. The predetermined dose of the sample is then injected into the inlet for anlaysis.

Another important feature of the invention is the provision of adjustable dosage controlling stops which enable predetermined doses of the sample fluid to be injected into the analyzer. The injection syringe assembly comprises a syringe barrel which is supported by a reciprocable carriage and a plunger supporting member connected to the carriage for movement with it and which is movable with respect to the carriage by a plunger actuator. A pair of selectively operated dosage stop assemblies are disposed on the syringe carriage and each includes a stop element which is movable to a stop position where the plunger supporting member engages the stop element to prevent further movement of the plunger into the syringe.

After the purging cycle is completed but prior to the removal of the syringe from the waste system, the syringe plunger is advanced to a dosage stop to expel fluid from the syringe until the predetermined sample dose remains in the syringe. The syringe carriage is then operated to remove the syringe from the waste system and advance it into the analyzer. When the dosage stop element is moved out of the path of the plunger supporting member the plunger can be driven into the syringe to inject the predetermined dose into the analyzer.

Each of the dosage stops assemblies are infinitely adjustable with respect to the syringe carriage to enable the injection of any dosage within the capacity of the syringe. The dosage stops are independently operated so that two different dosage levels may be provided for the injection syringe at any time.

Another important feature of the invention is the provision of a sample storage module and an injection module which are detachably fastened together and can be fastened together in various orientations with respect to each other without disconnecting electrical and fluid conduits extending between them. In one preferred embodiment, the storage and injection modules are interconnected by electrical and fluid flow conduits. The injection module and storage module are provided with alignable access openings through which the conduits extend when the modules are fastened together. Each module includes an alternate access opening for the conduits when the modules are fastened together in another orientation. The access openings are provided with slots which enable the conduits to be guided from one access opening through its associated slot into another access opening through its associated slot. The modules are then fastened together in the new orientation with the conduits extending through one or both of the now aligned alternate access openings.

This capability of the injection and storage modules enables the use of injection and storage modules constructed according to the present invention with many different analyzers and without requiring the various conduits between the modules to be disconnected when the modules are being oriented with respect to each other.

Another feature of the invention is the provision of mechanical interlocks which prevent the storage module dipper tube from being damaged by attempts to insert it in a container which is not properly aligned with the dipper tube. In the preferred and illustrated embodiment of the invention several container supporting trays or racks are connected to a turntable and are driven carrousel fashion from the turntable so that successive sample containers are moved to an extraction station defined within the storage module. The turntable is driven by a reversible electric motor and each of the trays or racks is provided with peripheral cam track against which a cam follower is biased. When a particular container is located approximately at the extraction station, operation of the drive motor is terminated and the cam follower reacts against the cam track on the sample tray to further rotate the tray and accurately position the container with respect to the dipper tube assembly. If the cam follower is not able to accurately position the container the follower is disposed in the path of a guide rod associated with the dipper tube assembly and acts as a stop which prevents the dipper tube assembly from advancing.

Another feature of the invention is the provision of a sample analysis system wherein a control module governs operation of sample storage and injection modules and is capable of interrelating these operations with a computer. The system is constructed and arranged so that the entire analysis of multiple samples can be controlled by a programmed computer while at the same time permitting system operation by an operator.

Other features and advantages of the invention will be apparent from the following detailed description of a preferred embodiment made with reference to the accompanying drawings which form a part of the specification.

BRIEF DESCRIPTION OF THE DRAWINGS

FIG. 3 is a top plan view of an injection module forming part of the system of FIG. 1 with parts removed;

FIG. 4 is a cross sectional view seen approximately from the plane indicated by the line 4—4 of FIG. 3;

FIG. 5 is a cross sectional view seen approximately from the plane indicated by the line 5—5 of FIG. 3;

FIG. 6 is a cross sectional view seen approximately from the plane indicated by the line 6—6 of FIG. 5;

FIG. 7 is a cross sectional view seen approximately from the plane indicated by the line 7—7 of FIG. 5;

FIG. 8 is a plan view of a sample storage container module forming part of the system of FIG. 1 with parts removed and portions broken away;

FIG. 9 is a cross sectional view seen approximately from the line 9—9 in FIG. 8;

FIG. 10 is a cross sectional view seen approximately from the plane of the line 10—10 of FIG. 8;

FIG. 11 is a cross sectional view of part of a dipper tube assembly forming part of the storage module of FIGS. 8–10 inserted in a sample container with parts broken away;

FIG. 12 is an elevational view of one side of a sample storage tray;

FIG. 13 is an elevational view of the opposite side of the sample storage tray of FIG. 12;

FIG. 14 is an enlarged elevational view of the portion of the tray of FIG. 12 within the line 14;

FIG. 15 is a cross sectional view seen approximately from the plane indicated by the line 15—15 of FIG. 14;

DESCRIPTION OF A PREFERRED EMBODIMENT

Figure 1:
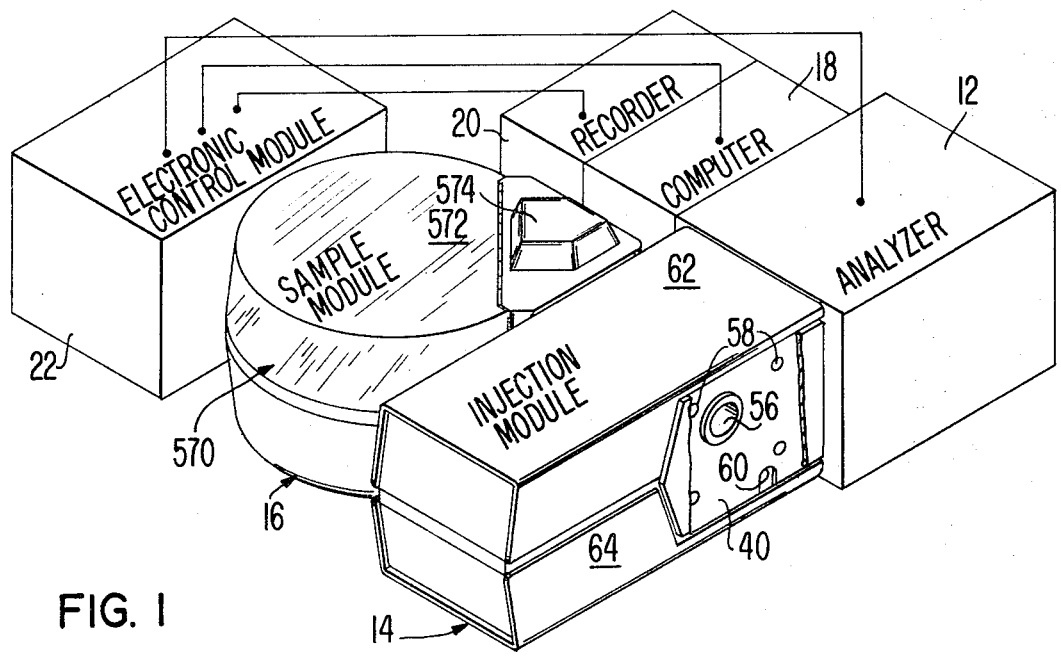
FIG. 1 is a perspective view of a sample analysis system embodying the present invention with parts illustrated schematically.

An automatic sample analysis system 10 embodying the present invention is illustrated in FIG. 1 as comprising a sample analyzer 12, which may be, for example, an apparatus for analyzing a fluid sample by liquid or gas chromotography; a sample injection module 14 by which a sample of fluid to be analyzed is injected into the analyzer 12; a sample storage module 16 which houses a number of discrete samples of fluid to be analyzed and which supplies sample fluid to the injection module; a sample analysis computer 18 which is programmed to partially govern operation of the system and to receive raw data from the analyzer concerning the analysis of a given sample of fluid and to process that data into a desired useable form; a recorder 20 which is connected to the analyzer for producing graphic information concerning the analysis of given samples by the analyzer; and an electronic control module 22 which generally governs the operation of the remaining components of the system 10.

In brief, the system 10 operates in the following manner: The injection module and sample storage module are connected to each other in a desired orientation, for example, in the orientation shown in FIGS. 1 or 2 and are detachably connected to the analyzer 12, which may be of any suitable or conventional type or construction, and a number of containers of sample fluid are disposed in the storage module. Automatic operation of the system is then initiated by the operator which results in a predetermined quantity of sample fluid from one container in the storage module 16 being extracted and delivered to the injection module 14 from which a predetermined quantity of the sample is injected into the analyzer 12. The analyzer 12 processes the sample fluid and data resulting from the analyzer process is fed to the computer 18 and/or the recorder 20. At the same time, information concerning the identity of the sample injected into the analyzer is supplied to the control module from the storage module and thence to the recorder and computer so that the data being obtained from the analyzer is identified with the particular container from which the sample was removed. After the first fluid sample has been analyzed, sample fluid from a second container is directed from the storage module to the sample injection module and the analysis process is repeated. When all of the samples have been analyzed, the operation of the system 10 is automatically terminatable.

Prior to the injection of each fluid sample into the analyzer, the flow passageways through which the sample passes from the storage module into the analyzer are purged to remove substantially all traces of the preceding sample fluid from the passages prior to the introduction of the next succeeding sample to the analyzer. Purging is conducted using the next succeeding sample fluid itself or using a suitable solvent and then the next succeeding sample fluid so that the possibility contaminating any given fluid sample by the preceding sample or the solvent is minimized. The purging solvent is contained by the storage module like the samples and is introduced into the passages to be purged. The sequence of operation of the system 10 is governed by the control module in cooperation with the computer.

It should be appreciated that the brief description of the operation of the system 10 has been simplified and generalized in order to provide an overall understanding of the functions and interrelationships of the various modules and components of the system 10. The various modules and components of the system 10 are described separately below.

The Injection Module 14

The injection module 14 comprises a support frame 30 which supports a syringe carriage assembly 32, a carriage actuator 34 and a waste receiving system 36. The syringe carriage assembly 32 includes a sample injecting syringe, described in detail presently, which is movable by operation of the carriage actuator 34 to inject a predetermined quantity of sample fluid into the analyzer 12 as well as to inject purging fluid into the waste receiving system 36. The injection module 14 is illustrated in FIGS. 3–7 of the drawings.

Referring particularly to FIGS. 3 and 5, the frame 30 is illustrated as including side panels 40, 42, opposite end walls 44, 46 extending between the side panels, and a base section 48 extending from the end wall 46 between the side panels 40, 42. A pair of cylindrical guide rods, or ways, 50 extend between the end walls 44, 46 parallel to the side panels. The end wall 44 mounts along the face of the analyzer 12 by interconnection of the end wall 44 to the analyzer by suitable connectors (not shown). The end wall 44 defines an opening 52 which is aligned with an analyzer sample inlet which is shown in part in FIG. 5 at 12a. The sample inlet 12a is provided with an inlet port through which the needle or canulla, of the injection syringe extends when a sample is being injected into the analyzer. The inlet sample port is covered by a septum as is conventional, so that in order to inject a sample of fluid into the analyzer the syringe needle must pierce the septum covering the analyzer inlet port.

The side panels 40, 42 extend away from the analyzer 12 and each defines an access port 56 and connector openings 58. Fluid and/or electric conduits extend through one or the other of the ports 56 from the storage module 16 depending upon which of the side panels 40 or 42 is engaged with the storage module. The connector openings 58 function to enable detachable connection of the storage module to the injection module by screws or other suitable fasteners which extend between the modules.

Figure 2:
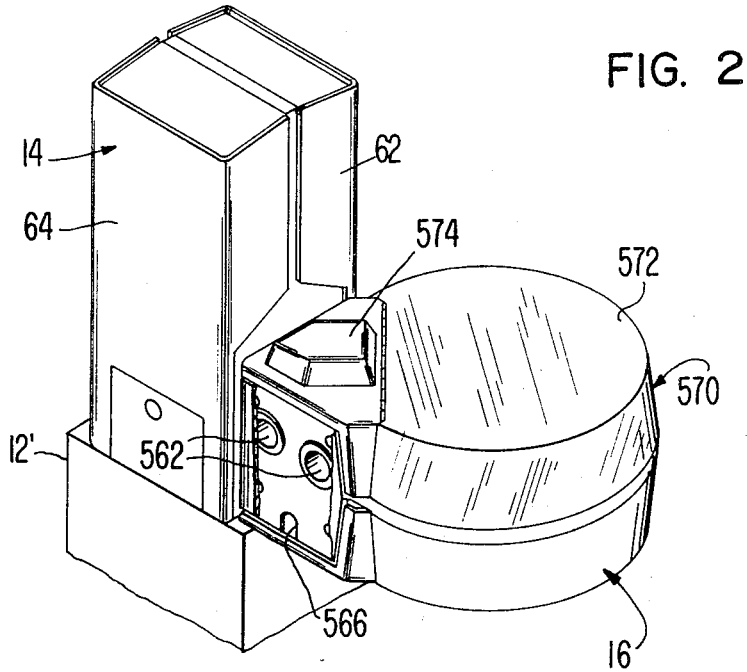
FIG. 2 is a perspective view of a portion of the system of FIG. 1 with components shown in a different orientation.

Slot 60 enables repositioning of the storage module from one side panel of the frame 30 to the other side panel without requiring disconnection of the conduits extending between the modules during the repositioning. That is to say, the conduits can be guided from one access opening through the associated slot 60, and to the other access opening through its associated slot 60 without disconnecting the conduits from the injection module. Repositioning of the storage module with respect to the injection module might be occasioned where the storage and injection modules are utilized in connection with various analyzers having different physical configurations. One such repositioning of the modules is illustrated by FIGS. 1 and 2. In the configuration shown by FIG. 1, the modules are attached to an analyzer 12 having a horizontal sample inlet while in FIG. 2 the same modules are repositioned and connected to an analyzer 12' having a vertical sample inlet.

Removable cover panels 62, 64 are connected to the frame 30 to shield the internal components of the injection module 14 when in use, and are removed to enable access to these components for servicing and maintenance. One or both cover panels 62, 64 are also removed when the injection module is repositioned with respect to the storage module to enable manipulation of the interconnecting conduits from one access opening to the other as described above. The cover panels 62, 64 are illustrated in FIGS. 1 and 2 but are not illustrated in FIGS. 3–7.

The syringe carriage assembly 32 is supported on the ways 50 and is reciprocally movable towards and away from the end wall 44 to accomplish the functions of injecting a sample fluid into the analyzer as well as to direct purging fluid into the waste system. The assembly 32 comprises a carriage support body 70 which is slidably mounted upon the ways 50, a syringe assembly 72 carried by the body 70, and a syringe actuating assembly 74 also carried by the body 70.

The body 70 comprises a base 76 which extends parallel to the frame base section 48 between the side panels 40, 42. The base 76 carries projecting transverse flange-like portions 78, 80 through which the ways 50 slidably extend. The projecting flange-like portions are spaced apart along the body 76 to assure rectilinear motion of the carriage assembly.

The actuator 34 is preferably a single acting pneumatic ram type actuator comprising a cylinder 84 which is connected to the frame base 48 by a suitable pillow block connection and which has a piston rod 86 connected to the carriage flange 78. When the actuator 34 is supplied with operating fluid pressure the piston rod 86 moves the carriage assembly towards the left, as seen in FIG. 5, to advance the syringe assembly 72 toward the frame wall 44. The actuator 34 is provided with an internal return spring which functions, when the cylinder 84 is vented, to move the carriage assembly towards the right as seen in FIG. 5 to the position which is illustrated in FIG. 5. At this position the syringe assembly 72 is retracted away from the end wall 44 to the limit of its travel.

The syringe assembly 72 comprises a tubular syringe barrel 90 within which a solid plunger 92 is slidably disposed. The barrel 90 and plunger 92 cooperate to define a variable volume chamber 93 within the syringe barrel. The end of the syringe barrel remote from the plunger supports a hollow needle, or canulla, 94 which communicates with the chamber 93 and projects from the syringe barrel towards the frame end wall 44. The syringe barrel 90 is preferably of the type known as a side arm syringe and defines a side wall port 96 through which fluid can be directed into the chamber 93 between the plunger and the needle 94.

The syringe barrel 90 is mounted on the support body 70 by a barrel support member 100 and a barrel supporting bracket 102. The syringe barrel itself is formed from glass and is graduated appropriately. The barrel is removably connected to the barrel support member 100 and the support bracket 102 for easy replacement.

A syringe needle guiding and supporting member 104 is associated with the barrel support member 100 and functions to both guide and support the needle 94 as it is thrust through a septum. The member 104 is a generally U-shaped member having legs 106, 108, which extend parallel to the needle 94 along the support member 100, and a bight portion 110 which extends transverse to the needle. A guiding bore 112 is formed in the bight portion 110 through which the needle 94 extends. The bore 112 is of a diameter which is just slightly larger than that of the needle so that the needle is guided through the bore and supported by the bight portion 110. The tip of the needle 94 extends just beyond the bight portion 110 when the carriage assembly is in the position illustrated in FIGS. 3 and 5. The leg 106 extends through an opening in the support member 100 and carries a flange-like collar 106a which is engaged by a compression spring 114 which reacts between the collar 106a and a spring abutment element 115 fixed to the body 70. The leg 106 slidably extends through an opening in the spring abutment element 115 and is aligned with an opening formed in the bracket 102 so that the member 104 may reciprocate relative to the needle 94 against the force of the spring 114.

The member 104 provides point of entry support for the needle 94 as the needle is advanced through a septum. For example, referring to the analyzer inlet 12a, as the carriage assembly is advanced towards the analyzer inlet 12a the bight portion 110 of the member 104 engages the analyzer inlet at about the same time that the tip of the needle 94 engages the inlet septum. As the carriage continues to advance, the needle is thrust through the septum while the member 104 engages the analyzer inlet and is prevented from moving further towards the analyzer with the needle. The member 104 thus is moved relative to the barrel support member 100 against the bias of the spring 114 and the bight portion 110 of the member remains adjacent that portion of the needle which is currently passing through the septum. Hence, the bight portion of the U-shaped member continually supports the needle adjacent the point of entry of the needle into the septum thus tends to minimize the possibility of bending the needle as it is being advanced through a septum.

The chamber 93 and the plunger 92 are preferably cylindrical and have relatively small diameters since desirable sample quantities of fluid being injected into the analyzer are normally quite small, e.g., from 5 to 50 microliters. Accordingly, the plunger has an extremely small diameter as compared to its overall length. The plunger is supported for reciprocal movement relative to the barrel by guides which prevent the plunger from buckling under compressive loads. As seen in FIGS. 3 and 5, the plunger projects out of the syringe barrel away from the analyzer 12 and through a guide tube 92' formed in a projecting leg 122 of the bracket 102. The guide tube 92' closely surrounds the plunger 92 to maintain the plunger accurately aligned with the syringe barrel. The plunger projects beyond the leg 122 and terminates in a radially projecting flange-like end portion 92a.

The syringe actuating assembly 74 functions to reciprocate the plunger 92 in the syringe barrel 90 so that a predetermined quantity, or dose, of sample fluid can be injected into the analyzer 12 and to enable purging of the chamber 93 and the needle 94. The syringe actuating assembly 74 includes a plunger drive mechanism 130, an actuator 132 for the plunger drive mechanism, and adjustable dosage stops 134, 136 which individually function to control the position of the plunger within the syringe barrel prior to the injection of a sample of fluid into the analyzer, and hence determine rather precisely the dosage of the fluid which is injected.

The plunger drive mechanism 130 comprises a cross bar 140 which is slidably disposed on the ways 50 and plunger engaging elements carried by the cross bar which cooperate to cushion compressive shock loadings which might otherwise be applied to the plunger, as well as to withdraw the plunger from the syringe barrel. The plunger engaging elements include a plunger guide member 142, a plunger engaging leaf spring 144 and a spring backup member 146 all of which project from the cross bar towards the plunger end portion 92a. The plunger guide 142 defines a bore through which the plunger 92 extends and the flange 92a at the projecting end of the plunger is interposed between the guide member 142 and the leaf spring 144.

The actuator 132 is operative to shift the cross bar and its related elements along the ways 50 relative to the carriage 70 to reciprocate the plunger 92 with respect to the plunger barrel. When the plunger 92 is withdrawn from the syringe barrel and moved towards the right, as viewed in FIG. 5, to the position illustrated, the guide 142 engages the plunger flange 92a to transmit plunger retracting force from the actuator 132 to the plunger.

As the actuator 132 is operated to shift the cross bar and associated elements towards the left as seen in FIG. 5, the plunger 92 is thrust into the syringe barrel and the force from the actuator is transmitted to the plunger 92 through the leaf spring 144. When the actuator is initially operated to advance the plunger 92 into the syringe it has a spring constant so that the leaf spring 144 deflects only very slightly. The backup member 146 is positioned beyond the leaf spring so that undue deflection of the spring will not occur.

The actuator 132 is preferably a double acting pneumatically operated ram which provides for positive positioning of the syringe plunger 92 in the barrel. The actuator comprises a cylinder 150 ported at both ends and fixed to the carriage body 70, and an internal piston supporting a piston rod 152 connected to the cross bar 140. The piston rod 152 reciprocates the cross bar 140 relative to the carriage body.

The piston rod can be prevented from moving relative to the cylinder by fluid pressure forces applied to both sides of the piston when desired. This positively maintains the cross bar 140 at a predetermined location and prevents the plunger from moving relative to the syringe barrel.

The carriage body 70 is provided with a slot 156 (see FIG. 3) which enables the guide 142, leaf spring 144 and backup member 146 to be shifted along the direction of movement of the plunger 92 without interferring with the carriage body.

The dosage stops 134, 136 are identical and accordingly only the stop 136 is described in detail. The stop 136 is preferably formed by a solenoid 160 which is slidably disposed in an elongated slot 162 formed in the carriage body 70 (see FIG. 3). A clamp mechanism 164 is associated with the solenoid 160 to enable the solenoid to be clamped and maintained at any desired position along the slot 162.

The solenoid 160 includes an armature in the form of a pin 168, or stop element, which, when the solenoid is actuated, projects from the solenoid 136 into the path of movement of the cross bar 140 to prevent the plunger 92 from being advanced further into the syringe barrel. The pin 168, in its extended position, is illustrated in FIG. 5. When the solenoid 160 is deenergized, the pin 168 is retracted by operation of a return spring (not illustrated) and the cross bar 140 is movable to further advance the plunger 92 into the syringe barrel.

When the plunger drive mechanism 130 is in its position illustrated in FIG. 5, the cross bar 140 is at the limit of its travel towards the frame end 46 and the plunger 92 is retracted from the syringe barrel to its limit of travel. As illustrated in FIG. 7, at the limit of plunger travel in the retracted direction, the projecting tip of the plunger 92 is adjacent the side arm port 96 of the syringe barrel so that fluid can be directed through the side arm 96 into the chamber 93 and through the needle 94. This is the manner by which the syringe barrel is purged. It should be noted that the tip of the plunger 92 is impinged on by the fluid passing through the side arm port 96 and the turbulent fluid flow at the tip of the plunger produces a scouring action on the plunger tip which aids in removing any residual materials which may otherwise cling to the plunger tip.

After purging is accomplished, one or the other of the dosage stops 134, 136 is energized and the actuator 132 is operated to advance the plunger 132 into the syringe barrel until the cross bar 140 abuts the projecting pin 168 of the energized dosage stop. This prevents further movement of the plunger 92 into the syringe and provides a predetermined quantity of sample fluid in the chamber 93 and needle 94 which can be then injected into the analyzer 12. The piston of the actuator 132 is then locked in position by the application of substantially equal fluid pressure on both sides of the piston and the dosage stop solenoid is deenergized to retract the pin 168. The application of fluid pressure to both sides of the actuator piston relieves any shearing force exerted by the cross bar on the pin 168 so that the pin is freely retracted.

The carriage body 70 is then advanced to thrust the needle 94 into the analyzer inlet after which the actuator 132 is again energized to advance the plunger 92 into the syringe barrel from the dosage stop location of the plunger to the limit of the plunger travel towards the analyzer. A predetermined dose of fluid is thus injected into the analyzer. The limit of plunger travel, in the preferred and illustrated embodiment, occurs when the cross bar 140 encounters the mounting nut for the actuator; however, any other suitable abutment can be provided if desired. The individual operation of the dosage stops allows two different sample dosages to be preset without requiring readjustment of the dosage stop positions.

As is described previously with reference to FIGS. 3, 5 and 7 the syringe barrel and needle are purged by flowing fluid through the side arm 96, the chamber 93 and the needle 94 prior to the injection of a predetermined dose of the sample fluid into the analyzer 12. The purging operation is necessary to assure that the sample fluid injected into the analyzer is as pure as practical. During the purging operation, the purging fluid, whether it be a solvent or sample fluid, is expelled from the needle 94 into the waste system 36.

The waste system 36 is particularly adapted to receive purging fluid which is relatively volatile at room temperature and atmospheric pressure and to prevent the vapor of such fluid from escaping in quantity from the injection module. Such vapor, depending upon the nature of the fluid, can be flammable and/or toxic. The waste system 36 comprises a waste receiver 200 which communicates with a removable waste storage tank 202 through a flexible conduit 204.

The waste receiver 200 is a generally tubular member having an end opening 206 which is covered by a septum 208. The waste receiver 200 is connected to a movable support arm 210 which normally supports the receiver 200 at a position where it is interposed between the needle 94 and the analyzer inlet 12a. The needle 94 is advanced through the septum 208 by movement of the carriage body 70 after which purging of the syringe barrel is accomplished with the purging fluid being directed into the receiver 200 to the tank 202 via the conduit 204.

The support arm is pivoted to a bracket 212 and is movable with respect to the bracket to pivot the receiver 200 from its normal waste receiving position to a retracted position at which the receiver does not interfere with the movement of the needle 94 into the analyzer inlet. The receiver 200 is pivoted to its retracted position by operation of a solenoid 214 which, when energized, moves the receiver to its retracted position. When the solenoid 214 is deenergized a return spring, not illustrated, operates to return the receiver 200 to its waste receiving position.

The support arm 210 carries a stop member 216 which projects from the support arm towards the end wall 44 of the frame 30 and towards the carriage body 70. When the waste receiver 200 is positioned away from its retracted position, i.e., when it is interposed between the needle 94 and the analyzer inlet 12a, and the carriage 70 is advanced, the stop 216 is engaged between the carriage 70 and the end wall 44 of the frame 30 so that the actuator 34 cannot advance the needle 94 into the far end of the waste receiver 200. This prevents breakage of the syringe needle which would otherwise occur. When the waste receiver 200 is in its retracted position the stop 216 is aligned with a slot 218 formed in the carriage flange 78. Hence, when the needle 94 is advanced into the analyzer inlet 12a the stop 216 passes through the slot 218 in the carriage flange and does not impede movement of the carriage towards the analyzer.

In the preferred embodiment of the invention the electrical conduits for the various solenoids, the pressure conduits for the carriage body and plunger actuators and a sample fluid supply conduit to the syringe side arm port 96 are all channeled into the injection module through one of the access openings 56 from the storage module. The storage module 16 houses fluid control valves and associated parts for the various conduits.

The Storage Module

The storage module 14 supports a plurality of separate containers 240 for fluid samples and purging solvents and defines an extraction station 250 at which a fluid sample or purging solvent is extracted from a respective container and is directed to the injection module 14. The individual containers 240 are supported by a plurality of the sample supporting tray members, or racks, indicated by the reference characters 252-255 (see FIG. 8). The trays, or racks, are individually removable from the storage module 16 with their associated sample containers. An actuator assembly 258, forming a part of the module 16, moves the container supporting trays in carrousel fashion so that individual containers are successively moved to the extraction station 250 from which the contents of the container at the extraction station can be removed and directed to the injection module.

Referring now to FIG. 9, the storage module 16 comprises a support frame 260 which is defined by a peripherally extending skirt 262 and a circular base plate 264 connected to the skirt. Side panels 266, 268 extend perpendicularly with respect to each other and generally tangentially with respect to the support base portion 264 and skirt 262 to define a projecting corner of the storage module. The extraction station 250 is located at the projecting corner of the module and the trays 252-255 are circularly arranged over the support base 264.

The sample supporting tray members 252-255 are, in most respects the same, and only the tray 253 is described in detail to the extent that the trays are identical. The tray 253 is shaped to approximate a frustum of a 90° circular segment having a circularly curved outer wall 270, radially extending side edges 272, 274 and a radially inner edge 276 which extends between the side edges. A segmental radially inner tray body 280 extends between the edges 272, 274, 276 and terminates in a circular wall portion 282. The edges of the tray member are defined by lips which project from face of the body 280 and these lips, along with radially extending webs 284, rigidify the tray body portion 280. A pair of cylindrical bosses 285 extends from the body 280 beyond the webs 284. The bosses provide a detachable driving connection with the tray actuator assembly 258 as is described in greater detail presently.

A radially outer tray body portion 286 extends from the wall 282 and is recessed from the body 280. The outer tray body portion 286 terminates in the circumferential wall 270 and is rigidified by integral webs 292 which extend radially outwardly from the wall 282 flush with the inner tray body portion 280.

A circumferential series of sample container pockets 296 (preferably 15 pockets for accommodating 15 separate containers) is disposed circumferentially about the periphery of the outer tray body 286. The pockets 296 are defined by semicircular recesses 298 formed in the tray wall 270 and semicircular faces 300 formed on projecting lugs 302 at the radially outer ends of the webs 292. The recesses 298 and faces 300 are positioned with respect to each other so that the container in each individual pocket is maintained accurately positioned in the pocket and constrained against tipping, even if the tray should be vertically oriented.

The container support actuator 258 comprises a turntable assembly 310 to which the individual trays 252-255 are detachably connected and a turntable drive mechanism 312 by which the assembly 310, and the attached trays, can be rotated with respect to the frame base 264. The assembly 310 comprises a support shaft 314 which extends through the frame base 264 and is supported for rotation about an axis 315 by a bearing unit 316 connected to the frame base. The projecting end of the support shaft 314 carries a circular tray support member 320 which is fixed to the shaft 314 for rotation about the axis 315 and which defines four pairs of circumferentially spaced locating holes 321. A drum-like member 322 is disposed between the tray support 320 and the frame base 264 and is fixed to the shaft 314 for rotation with it.

A tray locking assembly 324 is disposed beyond the tray support 320 from the drum 322 and functions to permit the individual sample supporting trays to be connected to and locked in place on the tray support member.

The locking assembly comprises a cylindrical body 330 which is fixed to the end of the shaft 314 for rotation about the axis 315. Four shouldered holes 332 are formed in the body 330 at locations spaced 90° apart about the axis 315, with the holes extending generally parallel to the axis. A circular retainer plate 334 is connected to the body 330 to close the holes 332. Each of the holes 332 supports a shouldered detent pin 336 and a helical compression spring 338 which reacts between the detent pin 36 and the retainer plate 334 so that the projecting end of the detent pin is urged from the body 330 towards the tray support 320.

Trays are inserted and locked in placed in the assembly 310 by cocking the tray slightly with respect to the support member 320 and inserting the inner edge 276 of the tray between the support member 320 and the body 330 of the locking assembly. The end of the detent pin 336 is rounded so that the detent pin is forced into its shouldered hole 332 against the force of the spring 338 as the tray is slid radially inwardly along the support member 320. When the locating bosses 285 are aligned with one pair of the locating holes 321 the tray is cocked downwardly so that the bosses 285 extend through the associated locating holes 321. At this juncture the webs 284 of the tray are engaged along the face of the support member 320 and the detent pin 336 is firmly engaged with the tray body portion 280 to maintain the tray member in contact with the support member 320. The bosses 285 cooperate with their respective locating holes to enable the transmission of drive from the rotatable support member 320 to the tray.

The drive mechanism 312 includes a reversible electric motor 340 having a gear reduction (not shown) connected to its rotor shaft. An output shaft of the gear reduction (not shown) extends through the frame base 264 and an output pulley 344 is connected to the projecting end of the gear reduction output shaft. A drive belt 346 is reeved about the pulley 344 and the drum 322 so that drive from the motor 340 is transmitted to the turntable assembly 310 and thence to the individual trays supported by the turntable assembly.

The containers 240 may be of any suitable construction but in the illustrated embodiment are glass vials which fit snuggly into the pockets 296. The containers 240 have a capacity of several milliliters of fluid and each container is closed by a septum 241 which is carried by a removable cap 348.

An important feature of the invention resides in the ability of the storage module 16 to receive from one to four trays of a large number of support trays which may be loaded with sample containers at locations remote from the actual location of the system 10. As an example, the system 10 can be a central analyzer system at which a primary analyzer system serves a number of separate laboratories. Sample trays can be loaded with sample and/or solvent containers in the laboratories and forwarded to the analyzer system, thus relieving the analyzer operator from the task of loading the sample trays and recording the identity of each sample and its position in the tray. Each of the trays is provided with indicia indicating the identity of the tray, by a decimal number as well as indicating, by decimal numbers, the identities of the individual pockets in the tray. When the trays are loaded at their individual laboratories, the personnel loading the trays need only record the tray or rack number and the substance in each container along with the associated pocket number. The operator of the analyzer need not be involved in this process. In the preferred embodiment, the module 16 can handle up to four of 16 separate sample trays at any given time.

The turntable assembly 310 moves the trays to position successive container locations at the extraction station 250. Fluid in a container at the extraction station is removed by a syringe-like dipper tube assembly 352 (which is described in detail below) and is directed to the injection module 14. The storage module 16 provides a container locating assembly which functions to precisely align the containers at the extraction station with the dipper tube assembly so that the dipper tube assembly is not damaged from being advanced into engagement with a misaligned container.

The storage module also houses a fluid container identifying system which functions to identify the container at the extraction station by tray and pocket number as well as by whether the container is a sample container or a solvent container. When a container has been appropriately located at the extraction station and identified, the dipper tube assembly 352 is operated to enter the container, extract fluid from it, and direct the fluid to the injection module 14.

The container locating assembly comprises a locating cam structure defined by the individual trays and a roller follower 360 which is biased into engagement with the cam structure. The roller 360 is supported by a lever 362 pivoted to the frame base 264 and is urged into engagement with the associated tray by a tension spring connected to the lever. Each of the trays 252–255 defines a circumferentially extending generally sawtooth configured cam truck 366 formed on its outer periphery adjacent the frame base 264. The cam trucks each define a series of radially outer peaks 368 and intermediate radially inner troughs 370. The roller 360 is urged into engagement with the peaks and troughs as the trays are rotated by the actuator 258. Each cam trough 370 corresponds to a particular container pocket. When each container pocket is aligned with the dipper tube assembly 352 the roller 360 is disposed in the cam trough. The motor 340 is energized to rotate the turntable so that a particular container is advanced to the extraction station and is approximately aligned with the dipper tube assembly 352. While the motor drives the turntable, the roller 360 rides along the cam track 366. When the motor is deenergized at the approximate desired container position, the roller is moved into the corresponding trough of the cam track by the force of the spring 364 (not shown). This movement of the roller causes rotation of the turntable and the trays by the spring force and results in the container being shifted into precise alignment with the dipper tube assembly. The roller is capable of rotating the motor and gear reduction when the motor is deenergized and thus eliminates the necessity of sophisticated, complicated motor controls which might otherwise be necessary to precisely locate the container pockets at predetermined desired positions.

The container identification system comprises a container identifying arrangement which ascertains the kind of fluid, i.e., sample fluid or solvent, at the extraction station. When a sample fluid container is located at the extraction station the system 10 is enabled to perform a complete purging and/or analysis cycle utilizing the sample fluid. When a solvent container is located at the extraction station the system 10 is automatically conditioned to perform only a purge cycle to avoid the injection of the solvent into the analyzer.

In the preferred embodiment of the invention, the containers 240 each cooperate with SPDT microswitches 382, 384 when the containers are at the extraction station and the interaction between the containers and the switch depends on whether the containers are sample or solvent containers. Three different containers 240a, 240b, and 240c are illustrated in FIG. 9. The containers 240a and 240b are representative of containers for solvent and sample fluid, respectively. The container 240b carries a removable ring 380a disposed about its cap 248 and spaced from the projecting end of the cap. All of the fluid sample containers 240b are provided with a ring 380a of the character described, and in each case the ring is positioned remote from the projecting end of the container cap 348. The container 240a carries a removable ring 380b which is disposed about the cap 348 at its projecting end. All of the solvent containers 240b are provided with a similar ring 380b disposed at the projecting end of the container cap 348.

When a given container is positioned at the extraction station 250 the container cap 348 is engaged by the operating arms of the microswitches 382, 384 (see FIG. 10). When a sample fluid container 240b is at the extraction station, the ring 380a is engaged with the arm of the microswitch 382 so that the microswitch 382 is actuated by the cap ring 380a while the microswitch 384 is not actuated. On the other hand, when a solvent container 240a is at the extraction station, the cap ring 380b is engaged with the arm of the microswitch 384 so that the microswitch 384 is actuated while the switch 382 is not actuated.

When a container is not aligned with the extraction station or when an empty pocket passes the station, neither of the switches 382, 384 is actuated. Alternatively, the rings 380a may be dispensed with and a wash cycle pin 701 (FIG. 10) can be inserted in the holes 702 in the periphery of the racks 252-255 to indicate that the particular location contains a wash material instead of a sample. Pin 701 reacts with the lower microswitch 283 to indicate presence of wash container. In this embodiment, both an indication of a pin and a vial is necessary to initiate a wash cycle.

The container for the final sample to be analyzed in any given series of analyses is provided with both a ring 380a and a ring 380b. Hence when the final sample is located at the extraction station both switches 382 and 384 are engaged by the respective cap rings 380a, 380b and both switches are actuated.

The switches 382, 384 are electrically connected to logic and sequence controlling circuitry in the control module 22 so that operation of the system 10 can be governed in part by information supplied to the control module from the switches 382, 384. If a sample container is sensed at the extracting station the system 10 will perform a complete purging and analysis cycle. When the final container is sensed, i.e., the container carrying both cap rings 380a and 380b, a purge and/or analysis cycle is completed by the apparatus after which the system 10 is automatically shut down. When a solvent container is detected and it is not desired to purge the injection syringe with solvent the turntable continues to index until a sample container is sensed. When a solvent is desired to purge the injection, the control module 22 can be conditioned to operate the turntable until a solvent container is sensed at the extraction station afterwhich the purging cycle is completed but not an analysis cycle. The tray and pocket identifying arrangement comprises a plurality of SPDT microswitches supported by the frame body 264 adjacent the extraction station along a line extending radially from the extraction station towards the turntable axis 315. Cam tracks are formed on each of the container trays. Each cam track faces a respective microswitch and operates the microswitch in such a way that identification of the sample tray and the particular pocket at the extraction station is provided to the control module 22. In the preferred embodiment, eight microswitches 401 – 408 are mounted on the frame base (see FIG. 8) and eight cam tracks 411 – 418 are formed on each of the tray bodies 286 (see FIGS. 12, 14 and 15). The cam tracks define lobes 420 projecting from the tray bodies for engaging and actuating the respective microswitches. The lobes are constructed to provide for binary coded actuation of the switches. The tray 253 shown in FIGS. 12-15 happens to operate only the switches 401 – 404 and accordingly the cam tracks 415–418 have no switch operating lobes. Removable cam tracks 415–418 are used to identify up to 16 different racks.

The microswitches are electrically connected to a binary decoder in the control module 22 and when the switches are actuated they produce signals which identify the particular pocket located at the extraction station as well as the identity of the tray at which the pocket is located. The use of eight switches enables the illustrated system 10 to be used with 16 separate trays each containing 15 sample pockets, i.e., the system is capable of handling 200 different identities. The control module binary decoder functions to identify the sample tray and pocket location of each sample being analyzed by decimal numbers and provides information to the computer and/or the recorder so that the data relating to the analysis is correlated to the actual sample fluid location and tray in the storage module 16. This information is preferably printed out by the computer and the recorder in terms of tray number and sample pocket location. The decimal identity of the container location can also be displayed on an operator's console if desired.

This feature avoids operator errors in identifying the sample analysis results since the computer printout and/or the recorder printout indicates the tray and sample pocket location of the sample analysis results and these results can be compared with the laboratory records indicating the samples which were placed in the trays prior to the analysis.

As is best seen in FIGS. 9-11, the dipper tube assembly 352 comprises an extraction syringe needle assembly 430, an associated pneumatic fluid purging system 432 (see FIG. 16) and an extraction syringe actuator assembly 434. The actuator assembly 434 comprises a syringe needle support plate 436 which is connected to a single acting pneumatic ram including a cylinder 440 connected to the frame by a supporting bracket 442 and a piston rod 444 extending between the cylinder 440 and the support plate 436. A radially inwardly projecting plate end 446 carries the needle assembly 430 for reciprocating motion towards and away from a container 240 at the extraction station. The plate 436 is connected to guide rods 450, 452 which extend through bores in the bracket 442 to guide the motion of the plate and the needle assembly as the plate is reciprocated by the ram 438. The guide rod 450 is surrounded by a helical compression spring 454 which reacts against the syringe support plate 436 to urge the piston rod 44 towards its fully extended position. When the piston rod retracted the plate and needle assembly 430 move towards the container and the needle assembly is thrust into the container through its system.

Referring to FIG. 10 it should be noted that if the container is not precisely aligned with the needle assembly the follower roller 360s not located in the corresponding cam trough 370. The resulting roller position is illustrated by broken lines in FIG. 10. In this position, the roller 360 is located in the path of movement of the guide rod 450 and blocks movement of the needle assembly 430 towards the container. This prevents possible damage to the needle assembly due to engagement with a misaligned container. Also, if dipper tube is down rotation of carriage is prevented.

FIG. 11 illustrates the needle assembly construction and the relationship between the needle assembly and the container when the needle assembly has been forced into the container. The needle assembly 430 comprises a central tubular needle 460 having a bullet-nosed tip 462 for piercing the septum and a central flow passageway 464. The central passageway communicates with a sample fluid conduit 466 which extends from the needle 460 to the side arm port of the injection syringe in the injection module. The passageway 464 opens into the container adjacent the tip 462 via ports 468 defined by a cross bore extending transversely through the needle. The ports are spaced from the tip so that they cannot core the septum and become blocked. When the needle assembly 430 is properly positioned in the container, the ports 468 are well below the level of the liquid in the container.

The needle 460 is surrounded by a second tubular needle 470 having a tapered end portion 472 fixed and sealed to the needle 460 at a location spaced from the tip 462. The needle 470 defines a passageway 474 surrounding the needle 460 which communicates with the purging system 432 via a manifold 476 (see FIG. 10) and with the container via ports 478 formed by transverse holes extending through the wall of the needle 470. The needle 470 penetrates the container septum sufficiently that the ports 470 are located within the container. The ports 478 open transversely of the needle 470 to prevent coring of the septum.

The purging system functions to force fluid from the container and into the injection module by exposing the container to a controlled volume of gas at a predetermined pressure. The volume of gas at the predetermined pressure can be considered to possess a predetermined amount of purging energy proportional to the product of the pressure and the volume. The PV energy of the purging gas thus accurately determines the quantity of fluid which is directed to the injection module. The waste system 36 is maintained at atmospheric pressure throughout each purge cycle. As fluid is forced from the container to the injection module the pressure in the container decays until the purging gas has expanded to a pressure about equal to atmospheric pressure.

Figure 16:
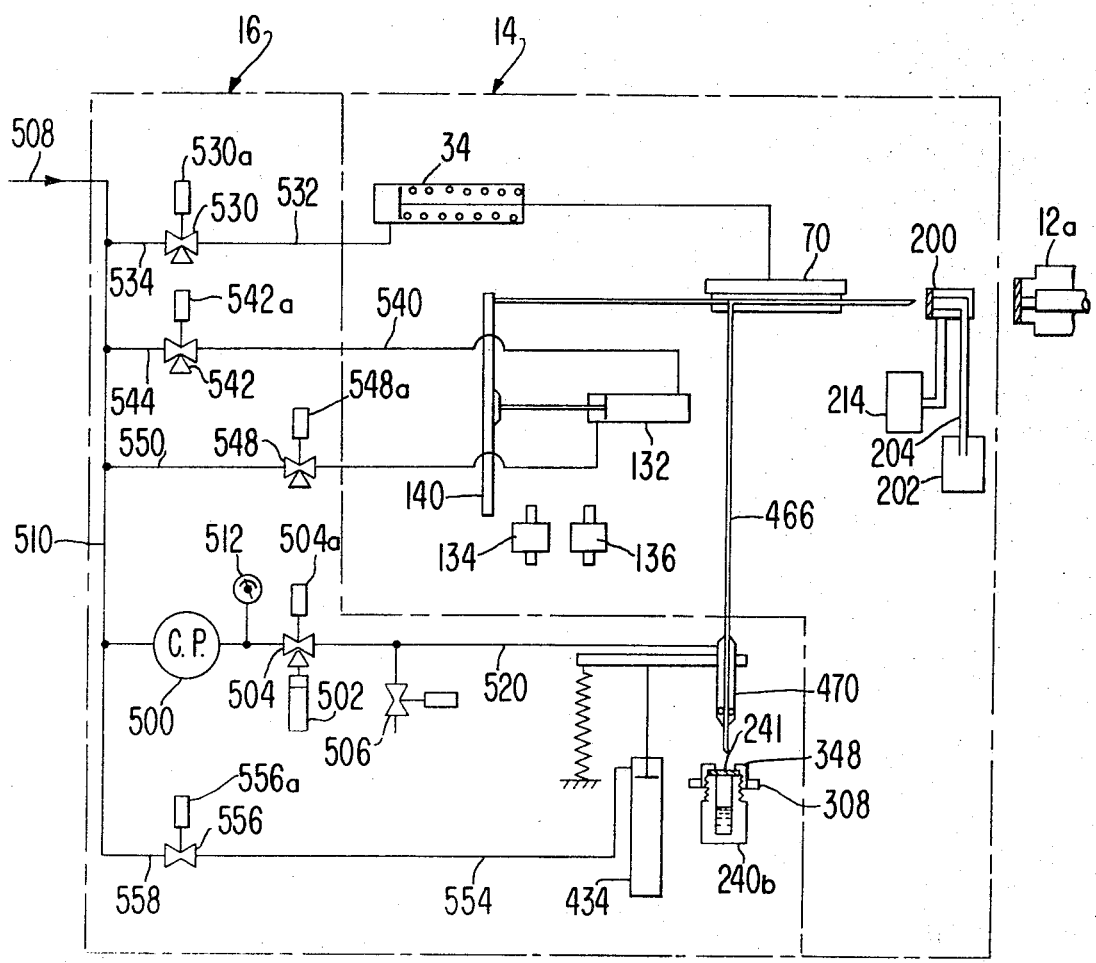
FIG. 16 is a schematic diagram of a fluid pressure system contained within the injection and storage modules; and, FIG. 17 is a schematic block diagram showing the interrelationship between components of a control module for the system as well as portions of the storage and injection modules.

As shown schematically by FIG. 16 the purging system 432 comprises a pressure regulating valve 500, a pressure accumulator 502, an accumulator control valve 504 and a vent value 506. The regulating valve 500 is connected to a source of pressurized gas by a supply conduit 508 and a pressure manifold 510 disposed in the storage module 16. The pressure source can be of any suitable or available construction and preferably provides air at pressures around 60 psig to the manifold 510 through the conduit 508 which extends into the module 16.

The regulating valve drops the supply pressure to a predetermined lesser pressure, e.g., 25 psig. The valve 500 can preferably be adjusted so that the controlled pressure can be varied as desired by the operator. A guage 512 is associated with the valve 500 so that the magnitude of the controlled pressure can be monitored.

The accumulator 502 is communicated with the regulating valve 500 via the control valve 504 which is a three-way solenoid operated valve having a small internal volume. The solenoid operator 504a is illustrated schematically and is operated from the control module 22. The control valve 504 has a first operating position in which the accumulator is communicated to the regulating valve 500 for charging the accumulator. This valve position is the "normal" valve position and the accumulator is nearly continuously maintained in its charged state.

The accumulator 502 may be of any suitable or conventional construction and is not illustrated in detail. The accumulator preferably has a volume of about 100 microliters and, when charged, the accumulated gas is at 25 psig. Because of the small accumulator volume it can be rapidly charged from the regulator valve 500 when the control valve 504 is in its normal position.

The control valve solenoid 504a is operated from the control module 22 to a second valve position wherein communication between the accumulator and the regulating valve 500 is cut off and the accumulator is communicated to the dipper tube needle 470 via a low internal volume conduit 520. This enables the accumulator to discharge into a fluid container via the needle 470 so that fluid can be forced from the container through the needle 460 to the injection module. The accumulator discharge is relatively rapid and accordingly the control valve 504 is only operated to its second, or accumulator discharging, position for about 4 seconds after which it returns to its normal position and the accumulator is recharged.

In the preferred and illustrated system, the injection syringe has an internal volume of about 10 microliters and the sample conduit 466 has an internal volume of about 10 microliters. It has been found that purging such a system with a flow of fluid equal to about 10 times the combined syringe and conduit volumes reduces the quantity of residual material in the purged volume to consistently low levels, e.g., to less than 0.01 percent by volume. Accordingly, in the preferred system, the 100 microliter accumulator, charged to 25 psig, is effective to produce a purging volume of solvent and/or sample fluid of about 200 microliters.

Some sample fluids have high vapor pressures at room temperature and if the accumulator were discharged into a container of such a fluid, the partial pressure of the vapor combined with the PV energy of the purging gas could cause an excessive quantity of the fluid to be forced from the container. Accordingly, in the preferred embodiment of the invention, after the needle assembly has been inserted into a container, the vent valve 506 is opened to communicate the container to atmospheric pressure via the needle 470, the conduit 520 and the valve 506. The valve 506 is operated by a solenoid 506a which is energized and deenergized from the control module 22.

After the vent valve 506 is opened to vent the container, it is reclosed and the container volume is substantially at atmospheric pressure. The control valve 504 is then actuated to discharge the accumulator into the container so that a predetermined controlled pressure differential is applied across the sample fluid, the fluid conduit 466 and the injection syringe assembly 72. In the preferred embodiment of the invention the control module functions to allot a one minute period during which purging is accomplished. Purging is normally completed within the alloted time.

Where a sample fluid has a relatively high viscosity, (e.g., greater than 1 cp) its flow resistance is relatively great and a single discharge of the accumulator may not provide sufficient energy for a complete purge during the alloted one minute purging period. In such circumstances the operator can condition the control module to operate the control valve 504 to discharge the accumulator a second time during the purging period, e.g., after 30 seconds have elapsed. The additional PV energy thus supplied to the container compensates for the high fluid viscosity. After purging is completed the dipper tube assembly is withdrawn from the container. Just as the dipper tube begins to withdraw, the control valve 504 is again operated to discharge the accumulator. The accumulator discharges partly into the container and partly to atmosphere as the dipper tube needle assembly is moved from the container septum. The portion of the discharge into the container is effective to provide an air pocket at least in the dipper tube needle 460. This reduces the chance that a drop of fluid from a preceding sample container can drip into a succeeding sample container during the dipper tube insertion.

Referring further to FIG. 16 the injection and storage modules 14, 16 are shown schematically by broken lines along with the various elements of the pneumatic system for operating the actuators in the modules.

As illustrated by FIG. 16 the injection syringe carriage actuator 34 is communicated to a solenoid control valve 530 in the storage module by a conduit 532. The control valve 530 is in turn connected to the pressure manifold 510 by a conduit 534. The valve solenoid 530a is energized and deenergized from the control module 22 to control operation of the valve. When the actuator 34 is operated to advance the syringe carriage towards the analyzer inlet 12a or the waste receptacle, the valve 530 is operated to direct high pressure air to the actuator 34. The carriage is retracted by operating the valve 530 to vent the actuator 34 so that the actuator return spring retracts the carriage.

The double acting plunger actuator 132 is communicated to the manifold 510 at one end via a conduit 540, a control valve 542 and a conduit 544. The opposite end of the actuator 132 is communicated to the manifold via a conduit 546, a control valve 548 and a conduit 550. The valves 542 and 548 each are operated by solenoids 542a, 548a which are wired to the control module. The valves 542, 548 are constructed like the valve 530 to either supply high pressure air to their respective ends of the actuator 132 or to vent the actuator, depending on energization of the solenoids. When both valves direct pressurized air to the actuator 132 the plunger is positively positioned by the actuator, as noted previously. This operation of the valves only occurs when the cross bar 140 engages one or the other of the doage stops 134, 136, which are schematically illustrated in FIG. 16, to enable retraction of the dosage stop element.

The single acting dipper tube actuator 434 is communicable to the manifold 510 via a conduit 554, a control valve 556 and a conduit 558. The control valve 556 includes a solenoid 556a wired to the control module 22. The valve 556 is constructed and functions the same as the valve 530.

As is apparent from FIG. 16 the pressure conduits 532, 540 and 546, as well as the sample fluid conduit 466 all extend between the storage and injection modules. Additionally, as noted above, the electric conductors for the dosage stops 134, 136 and the waste system solenoid 214 also extend from the storage module to the injection module.

As illustrated in FIGS. 2 and 9 the storage module frame side panels 266, 268 each include an access opening 560, 562, respectively, through which the various conduits and wires extend to the injection module. When the storage and injection modules are fastened together one or the other of the access openings 560, 562 is aligned with an injection module access opening 56, with the conduits and wires extending through the aligned opening.

In some circumstances it is desirable to be able to reorient the storage module with respect to the injection module in such a way that the conduits and wires all extend through the same injection module access opening 56 but through a different access opening in the storage module. In order to accommodate this type of reorientation each storage module access opening has an associated guide slot 564, 566, respectively, which opens into the access opening and extends to a side edge of the associated frame side panel 266 or 268. When the storage module is reoriented with respect to the injection module the conduits and wires can be guided from one access opening through the slots 564, 566 and to the other access opening without requiring disconnection of any of the conduits or wires from either module.

The storage module is preferably provided with a removable cover 570 (see FIGS. 1 and 2) having a transparent cover portion 572 extending over the turntable and container trays and a second cover portion 574 extending over the extraction station 250. The cover portion 572 is hinged to the portion 574 so that it may be lifted to enable quick removal and replacement of the trays. The entire cover 570 can be lifted from the storage module to permit access to the extraction station for servicing as well as to permit guiding of the conduits and wires from one access opening to the other.

Figure 17:
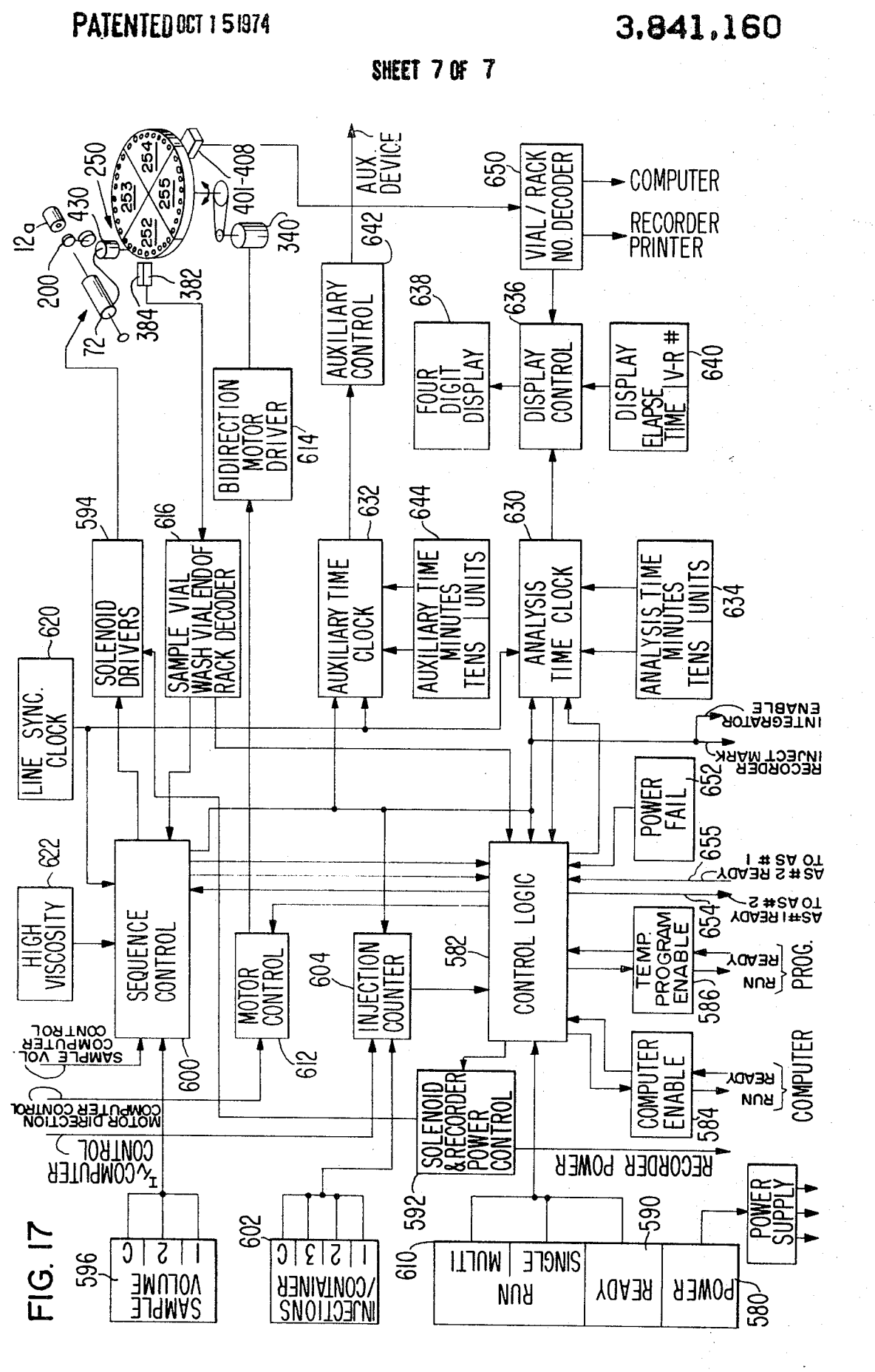

FIG. 17 schematically shows the functional interrelationships of the components of the electronic control module 22 as they are related to the remaining components of the system 10. For convenience, the overall operation of the system 10 is described in reference to FIG. 17.

For the purpose of the ensuing description it is assumed that up to four sample container trays have been loaded into the storage module with the containers or vials arranged so that the sample and solvent containers are in a desired sequence proceeding around the turntable; that the container pocket at the extraction station is empty; and that the system 10 is interfaced with a computer 18 which is programmed merely to process data produced by the analyzer 12 rather than to control the overall operation of the system 10.

The control module 22 is provided with a front panel (not illustrated) for switches and displays which are accessible to the operator. To initiate operation of the system 10, the operator depresses a front panel "power" switch button associated with circuitry 580 which functions to supply low voltage power to logic circuitry in the control module.

The operator then depresses a "computer enable" switch button associated with circuitry 584 to enable operation of the computer and a "temperature program enable" switch button is associated with circuitry 586. When an instrument such as a gas chromotograph is employed in the system, certain temperature conditions must be established in the instrument before it can be used to analyze samples. The temperature program enabling circuitry 586 enables these conditions to be sensed and, when they have been attained, provides a signal to the logic circuitry 582 to enable further operation of the system 10.

Likewise, the computer enabling circuitry 584 enables the computer to signal the logic circuitry 582 when the computer is conditioned to proceed.

When both the computer and the analyzer are enabled, the operator depresses a "Ready" switch buttom associated with circuitry 590 which enables the supply of higher voltage power for operating the solenoids and the recorder from a power supply 592. The power supply 592 supplies power to the solenoids in the injection and storage modules via solenoid driver circuitry 594 which comprises individual solenoid control switches. The power control 592 also functions to enable the recorder through a recorder controlling switch (not illustrated).

Sample volume selecting circuitry 596 governs which dosage stop in the injection module will be operated during the analysis cycles. The circuitry includes front panel switches by which the operator can select the desired sample dosage. When one of the switches is actuated, a sequence controlling circuit 600 is conditioned to effect operation of the selected dosage stop at appropriate times during the operation of the system.

The system 10 is capable of injecting repeated doses of each sample fluid into the analyzer for successive separate analysis of each dose. An "injection per container" circuit 602 and an injection counter circuit 604 cooperate with the logic circuitry 582 to enable this function. The circuitry 602 includes several selector switches on the front panel and it is assumed, for the purpose of this description, that the operator actuates the switch indicating a single injection per container.

At this juncture the system 10 is ready to be operated to analyze samples. The samples can be analyzed one at a time under the control of the operator such that in order to analyze each successive sample the operation of the system must be manually initiated by the operator. Alternatively the system can be conditioned to automatically analyze each successive sample without requiring operator assistance.

Run circuitry 610 cooperates with the logic circuitry 582 to control whether the system operates automatically or not. The run circuitry 610 includes selector switches labeled "single" and "multi" and it is assumed that the operator actuates the "multi" selector switch so that all of the samples in the storage module will be automatically analyzed.

Since the pocket at the storage module extraction station is empty, the logic circuitry 582 provides an operating signal to a turntable motor control circuit 612 which in turn initiates operation of the turntable drive motor 340 via a bidirection driver 614. The motor 340 drives the turntable until a sample container is sensed at the extraction station by the microswitch 382. The signal produced by the microswitch 382 is transmitted to a decoder circuit 616, from which the signal is transmitted to both the logic circuit 582 and the sequence control circuit 600. The logic circuit functions to enable the sequence control circuit to proceed while the signal from the decoder 616 to the sequence control circuit conditions the sequence control circuit to enable both a purge and an injection of the sample fluid.

The sequence control circuitry 600 next functions to cause the system components to perform the following steps:

1. The syringe carriage 70 is advanced to thrust the needle 94 into the waste receiver 200;
2. The actuator 132 for the plunger 92, which is initially in its fully depressed position, is subjected to fluid pressure to urge the plunger toward the depressed position;
3. The dipper tube assembly 430 is thrust into the sample container at the extraction station;
4. The container vent valve 506 is opened to vent vapor pressure from the container;
5. The vent valve 506 is reclosed;
6. The accumulator control valve 504 is operated to discharge the accumulator into the container;
7. The syringe plunger actuator 132 is operated to withdraw the plunger 92 to the side arm port;
8. A dwell period is provided during which purging is of the sample conduit 466 and the syringe assembly 72 is completed;
9. The dipper tube assembly is raised from the container;
10. The accumulator is discharged via the control valve 504 to place an air pocket in the dipper tube needle 460;
11. A dosage stop solenoid is energized to provide a preset dosage stop;
12. The plunger 92 is depressed to the dosage stop thus closing the syringe side arm port;
13. The syringe carriage is retracted to withdraw the needle 94 from the waste receiver;
14. The waste receiver is actuated to its retracted position;

15. The carriage 70 is advanced to thrust the needle 94 into the analyzer inlet 12a;

16. The pressure across the piston of the plunger actuator 132 is equalized;

17. The dosage stop solenoid is deenergized to retract the stop element;

18. The plunger 92 is driven into the syringe barrel to its limit of travel;

19. The syringe carriage 70 is retracted to withdraw the needle 92 from the analyzer inlet;

20. The waste receiver 200 is repositioned between the needle 92 and the analyzer inlet;

21. The plunger actuator is deenergized.

The enumerated steps each occur immediately after the preceding step except for steps 6 and 10 which preferably require a 4 second delay prior to the succeeding step. This is due to the time required to completely discharge the accumulator and each time the control vlave 504 is actuated to discharge the accumulator the four secnd delay period follows. So far as step 10 is concerned it should be noted that since the dipper tube assembly is withdrawn from the container as the accumulator discharges, the accumulator discharges directly to atmosphere during part of the four second period. The energy supplied to the container is not sufficient to remove all of the sample fluid from the conduit 466.

The time delay periods are determined by a clock circuit 620 which provides timed pulses to the sequence control circuit 600.

When a viscous sample fluid is to be injected the operator can enable a high viscosity circuit 622 which conditions the sequence control circuit 600 to discharge the accumulator into the container a second time during the dwell period of step 8.

When the sample is actually injected into the analyzer the sequence control circuit 600 sends an appropriate confirmatory signal.

When the fluid is injected the sequence control circuit provides a signal to the logic circuitry 584, the injection counter 604, an analysis time clock circuit 630, an auxiliary time clock circuit 632, the recorder 20, and to an integrator associated with the recorder.

The logic circuitry 582 initiates operation of the computer via the enabling circuitry 584 so that data from the analyzer is processed by the computer. The injection counter receives and stores the injection signal for comparison with the required number of injections per container selected by the circuitry 602. The signal to the recorder results in an injection mark being placed on the graph produced by the recorder.

The integrator is a device which integrates the area under the curve produced by the recorder and may be used along with a computer. In some installations where a computer is not available an integrator is used in place of the computer. The integrator is operated by the injection signal so that it is immediately operative as the recorder begins to produce the analysis results.

The analysis time clock circuit 630 receives timing pulses from the clock circuit 620 and governs the length of the analysis period. The length of the analysis time is preset by the operator via a time controlling circuit 634. The operator can preset the time by two dial switches graduated in tens and units of minutes. When the injection signal is received by the analysis clock circuit 630 it begins to time out.

The time clock circuit 630 provides one output to the logic circuit 582 and another output to a display control circuit 636. When the analysis time clock circuit has timed out, the output to the logic circuit causes termination of the first sample analysis cycle and enables analysis of the next succeeding sample. The output to the display control 636 enables the elapsed analysis time to be displayed on the front panel by a display circuit 638. The operator can cause the elapsed time to be displayed by depressing an elapsed time button forming part of a display selecting circuit 640.

The auxiliary time clock circuit 632 is associated with an auxiliary device controlling circuit 642 which governs operation of auxiliary devices, such as valves in the analyzer. In some circumstances it may be desired to change one or more physical conditions, such as temperature, in the analyzer at a predetermined time during the analysis. The auxiliary device is operated from the circuit 642 and the time clock circuit 632 to effect the desired change in condition. The operator controls the time during the analysis when the auxiliary device operates by a time controlling circuit 644 which is identical in function and construction to the circuit 634 described above.

When the sample container is first located at the extraction station, the microswitches 401–408 are appropriately actuated to produce a binary signal representing the tray or rack identity and the location of the container in that tray. The switches are shown schematically and out of position in FIG. 17 for the purpose of this description. The output from the switch is directed to a decoder circuit 650 which in turn has an output to the computer, an output to a printer of the recorder, and an output to the display control circuit 636. When an injection has been made and operation of the computer and the recorder is initiated, as described, the output from the decoder 650 cause the container and tray numbers to be printed on the output data from the recorder and computer. The container and tray number can also be displayed on the front panel when the opertor depresses a display button forming part of the circuit 640. The operator can thus immediately determine the identity of the sample container being analyzed.

When the analysis of the first sample is completed the analysis time clock circuit 630 signals the logic circuit 582 which in turn initiates another cycle by causing the motor 340 to operate so that the next container is moved to the extraction station 250. Assuming the next container is a solvent container, this fact is sensed by the microswitch 384 and then sent to the container decoder and an appropriate signal is supplied to the logic and sequence control circuits. The sequence control circuit operates the system through steps 1–10 enumerated above, after which the logic circuitry is supplied with a signal indicating the end of a cycle.

The logic circuitry then initiates a succeeding cycle by causing the next succeeding container to be moved to the extraction station. The various cylces are repeated until the final container in the storage module is sensed. The decoder circuit 616 provides a final container signal to the logic circuit so that after the final sample is analyzed the system is automatically shut down.

Some analyzers, particularly gas chromatographs, become unstable if their electrical power supplies are interrupted for any length of time. Generally, if a power outage occurs which is shorter than 10 seconds in duration the analyzer can be stabilized rather promptly. A power failure circuit 652 is provided in the control module for sensing a power failure, timing the duration of the failure and providing appropriate control signals to the logic circuitry 582. When a power failure is sensed, operations of those components of the system directly related to analysis of a sample are suspended (e.g., the analysis and auxiliary time clock circuits, the computer, the integrator and the recorder). If the power failure has a duration of less than a predetermined period, e.g., 10 seconds, the power failure circuit 652 governs the logic circuitry so that the operation of the system components remains suspended for a predetermined period of time during which the analyzer is restabilized. The analysis is thereafter enabled to proceed. If the power failure has a duration of more than 10 seconds the power failure circuit provides a signal to the logic circuit which causes the entire system to shut down. When power is restored the operator must restart the system to continue the analysis procedure.

The system 10 is adapted to be completely controlled by an appropriately programmed computer. To place the system under the operation of the computer the computer enable circuitry 584 is operated and the injections per container circuit 602 and sample volume control circuit 596 are conditioned for computer control by the actuator of respective switches marked C in these circuits. The computer can be programmed to operate the storage module turntable to seek out desired samples (aided by the decoder circuit 650), govern the operation of the sequence control circuitry 600, independently time out the analysis period to complete the analysis and proceed on to another sample container.

Some analyzers have two analyzer inlet ports and with such an analyzer it is possible to provide an injection module 14, a storage module 16 and a control module 22 for each inlet port. The operation of these separate units can be interrelated by interconnecting the logic circuits of each control module as shown by the lines 654, 655 of FIG. 17. This interconnection allows one unit to be readied for an injection while a sample from the other unit is being analyzed and vice versa.

While a single embodiment of the present invention has been illustrated and described in considerable detail, the invention is not to be considered limited to the precise construction shown. Numerous adaptations, modifications and uses of the invention may occur to those skilled in the art to which the invention relates and it is the intention to cover all such adaptations, modifications and uses which fall within the scope or spirit of the appended claims.

I claim:

1. A fluid sample apparatus for injection into a chromatograph:
   a. an injection syringe defined by a tubular syringe barrel, a canula extending from said syringe barrel, a side-arm defining a side arm location, and a plunger movably supported in said barrel;
   b. syringe barrel supporting structure;
   c. plunger supporting structure;
   d. an actuator connected between said syringe barrel supporting structure and said plunger supporting structure for reciprocating said syringe barrel and said plunger relative to each other so that said plunger is movable into and out of said syringe barrel; and
   e. dosage stop means in operation reacting between said syringe barrel supporting structure and said plunger supporting structure for limiting relative motion of said plunger into said syringe barrel to control volume of fluid in said injection syringe when said plunger is between said side-arm location and said canula;
   f. said dosage stop means comprising:
      i. a stop element movable between a first position wherein said syringe barrel and plunger supporting structures are freely movable with respect to each other and a second position wherein said stop element reacts between said structures for limiting relative movement therebetween; and
      ii. locating means for detachably connecting said stop element to one of said supporting structures;
   g. said dosage stop means supported on said one supporting structure for adjusting movement relative to both of said supporting structures to adjustably position said stop element to control the dose in said syringe barrel and said locating means effective to secure said dosage stop means in said adjusted position wherein said actuator comprises a doubleacting ram operable to move one of said structures to a position in engagement with said stop element when said stop member is in said second position and to maintain said one structure in said position without exerting substantial force on said stop element, and further comprising a stop element actuator for moving said stop element to said first position from said second position.

2. In a fluid sample apparatus:
   a. an injection syringe defined by a tubular syringe barrel, a canula extending from said syringe barrel and a plunger movably supported in said barrel;
   b. syringe barrel supporting structure;
   c. plunger supporting structure;
   d. an actuator connected between said syringe barrel supporting structure and said plunger supporting structure for reciprocating said syringe barrel and said plunger relative to each other so that said plunger is movable into and out of said syringe barrel; and
   e. dosage stop means reacting between said syringe barrel supporting structure and said plunger supporting structure for limiting relative motion of said plunger into said syringe barrel to control volume of fluid in said injection syringe;
   f. said dosage stop means comprising:
      i. a stop element movable between a first position wherein said syringe barrel and plunger supporting structures are freely movable with respect to each other and a second position wherein said stop element reacts between said structures for limiting relative movement therebetween; and
      ii. locating means for detachably connecting said stop element to one of said supporting structures;
   g. said dosage stop means supported on said one supporting structure for adjusting movement relative to both of said supporting structures to adjustably position said stop element to control the dose in said syringe barrel and said locating means effective to secure said dosage stop means in said adjusted position and further comprising a second dosage stop means including a second stop element and second locating means for detachably connecting said stop element to said barrel supporting structure, said first and second dosage stop means slidably supported in first and second slots, respectively, said slots extending along said syringe barrel supporting structure in the direction of relative movement between said supporting structures, said first and second locating means detachably securing said first and second dosage stop means to said barrel supporting structure at desired locations along said respective slots.

3. In a system as claimed in claim 1 further including apparatus for withdrawing quantities of fluid from individual fluid sample containers at said station, said apparatus comprising a dipper tube member and a dipper tube actuator for advancing said dipper tube member into a container at said station and retracting said dipper tube from said container, means for aligning individual sample container locations with said dipper tube wherein said alignment means includes a motor for coarse alignment and a cam and a cam follower urged into engagement with said cam, one of said cam and cam follower supported for movement with said container supporting members and the other of said cam and cam follower fixed against movement with said container supporting members, said cam and cam follower biased into engagement and effective to shift said container supporting members relative to said station to a relative position at which individual ones of said container support locations are aligned with said dipper tube.

* * * * *